United States Patent [19]

Abusleme et al.

[11] Patent Number: 5,510,435
[45] Date of Patent: Apr. 23, 1996

[54] PROCESS FOR PREPARING THERMOPLASTIC HYDROGEN-CONTAINING FLUOROPOLYMERS

[75] Inventors: Julio A. Abusleme, Saronno, Italy; Sheldon J. Kirsch, Rockaway, N.J.

[73] Assignee: Ausimont S.p.A., Milan, Italy

[21] Appl. No.: 405,799

[22] Filed: Mar. 16, 1995

[30] Foreign Application Priority Data

Mar. 21, 1994 [IT] Italy ................... MI94A0520

[51] Int. Cl.⁶ ................... C08F 2/38
[52] U.S. Cl. ................... 526/207; 526/249
[58] Field of Search ................... 526/207

[56] References Cited

U.S. PATENT DOCUMENTS

| | | | |
|---|---|---|---|
| 3,053,820 | 9/1962 | Wechsler et al. | 526/207 |
| 3,265,678 | 8/1966 | Hecht | 526/207 |
| 3,624,250 | 11/1971 | Carlson . | |
| 3,642,742 | 2/1972 | Carlson . | |
| 3,847,881 | 11/1974 | Mueller et al. | 260/80.77 |
| 3,865,845 | 2/1975 | Resnick | 260/340.9 |
| 3,978,030 | 8/1976 | Resnick | 526/247 |
| 4,513,129 | 4/1985 | Nakagawa et al. | 526/249 |
| 4,524,194 | 6/1985 | Dumoulin | 526/84 |
| 4,683,274 | 7/1987 | Nakamura et al. | 526/207 |
| 4,739,024 | 4/1988 | Moggi et al. | 526/216 |
| 4,789,717 | 12/1988 | Giannetti et al. | 526/209 |
| 4,864,006 | 9/1989 | Giannetti et al. | 526/209 |
| 5,021,516 | 6/1991 | Wheland | 525/403 |
| 5,182,342 | 1/1993 | Feiring et al. | 526/206 |
| 5,264,530 | 11/1993 | Darmon et al. | 526/207 |

FOREIGN PATENT DOCUMENTS

| | | |
|---|---|---|
| 0073087 | 3/1983 | European Pat. Off. . |
| 0073295A2 | 3/1983 | European Pat. Off. . |
| 0076581 | 4/1983 | European Pat. Off. . |
| 0080187 | 6/1983 | European Pat. Off. . |
| 0185242 | 6/1986 | European Pat. Off. . |
| 0186215 | 7/1986 | European Pat. Off. . |
| 0526216 | 2/1993 | European Pat. Off. . |
| 0612767 | 8/1994 | European Pat. Off. . |
| 0617058 | 9/1994 | European Pat. Off. . |
| 0617058A1 | 9/1994 | European Pat. Off. . |
| 0625526 | 11/1994 | European Pat. Off. . |
| 578584 | 7/1946 | United Kingdom ........ 526/207 |
| 592486 | 9/1947 | United Kingdom ........ 526/207 |
| 941106 | 11/1963 | United Kingdom ........ 526/207 |

OTHER PUBLICATIONS

Copending U.S. application Ser. No. 08/405,811, filed Mar. 16, 1995, Abusleme et al—"(Co) Polymerization Process in Suspension for Preparing Hydrogen Containing Thermoplastic Fluoropolymers".

Copending U.S. application Ser. No. 08/332,748, Abusleme et al (filing date and title unknown.

*Primary Examiner*—Joseph L. Schofer
*Assistant Examiner*—N. Sarofin
*Attorney, Agent, or Firm*—Watson Cole Stevens Davis

[57] ABSTRACT

Cyclopentanes alkyl-substitued with one or more $C_1$–$C_6$ alkyls are used as chain transfer agents in (co)polymerization reactions carried out, either in suspension or in aqueous emulsion, at low temperatures, comprised between −30° and +30° C., for preparing thermoplastic hydrogen-containing fluoropolymers, such as for instance ethylene/chlorotrifluoroethylene and ethylene/tetrafluoroethylene copolymers, or homopolymers and copolymers of vinylidenefluoride. They are transfer agents having high efficiency, which are liquid and thus can be easily handled and dosed, non-toxic, yielding alkyl end groups of high thermal stability.

11 Claims, No Drawings

PROCESS FOR PREPARING THERMOPLASTIC HYDROGEN-CONTAINING FLUOROPOLYMERS

The present invention relates to a process for preparing thermoplastic hydrogens-containing fluoropolymers wherein the corresponding monomers are (co)polymerized via radicals in organic suspension or in aqueous emulsion at low temperature.

Various kinds of hydrogen-containing fluorinated polymers having thermoplastic properties are known in the art. A first class is constituted by copolymers of per(halo)fluoroolefins with olefins not containing halogens, such as for instance tetrafluoroethylene (TFE) or chlorotrifluoroethylene (CTFE) copolymers with ethylene, optionally containing a third fluorinated comonomer in amounts of from 0.1 to 10% by mols (see for instance U.S. Pat. Nos. 3,624,250 and 4,513,129). The preparation of such copolymers is generally carried out in suspension and, especially in the case of CTFE/ethylene copolymers, is preferably carried out at a low temperature (lower than 30° C.). A low polymerization temperature is necessary to favour comonomer alternation, avoiding formation of ethylene blocks which would cause a worsening of the mechanical properties and would render the product thermally unstable, with clear problems of decomposition, especially during high temperature processing stages.

Another class of thermoplastic hydrogen-containing fluoropolymers consists of polyvinylidenefluoride (PVDF) and of PVDF modified with small amounts (0.1–10% by moles) of other fluorinated comonomers. Such polymers are generally prepared by polymerization in aqueous emulsion at high pressure (usually around 25 bar) and at relatively high temperatures, generally from 30° to 150° C.

Recently the Applicant has found a new (co)polymerization process in aqueous emulsion of fluorinated olefinic monomers, optionally in association with non-fluorinated olefins, which allows to work at a low pressure with very low reaction temperatures, even up to −20° C. Such process, described in European patent application No. 94116994.8 in the name of the Applicant, whose content is incorporated therein by reference, requires the use of a radical photoinitiator and of ultraviolet-visible radiation. By operating at such low temperatures it is possible to obtain fluorinated (co)polymers having high structural regularity, characterized by a high rating temperature and by improved mechanical and processability properties.

Generally, it is also known that, to control the molecular weight of the final product, during the (co)polymerization it is necessary to add to the reaction medium a compound acting as a chain transfer agent. Such compound, to be used in a production process on industrial scale, should have the following characteristics:

(a) to be effective even at relatively low concentrations;
(b) to provide sufficiently stable end groups, so as not to jeopardize (co)polymer stability and not to cause undesired discoloration;
(c) to be readily dosable;
(d) not to be toxic or at any rate dangerous for the environment.

When working at low temperatures, between −30° and +30° C., as in the above described processes, it results particularly difficult to find a product capable of meeting the above indicated requirements.

At present the product most commonly used at low temperatures as chain transfer agent for thermoplastic hydrogen-containing fluoropolymers is chloroform. For instance, in U.S. Pat. Nos. 3,624,250 and 3,847,881 CTFE/ethylene copolymers are prepared in CFC-113 at 0° C. in the presence of chloroform as chain transfer agent. However, chloroform shows the drawback of being a chlorinated product with evidenced cancerogenic activity, thus causing considerable problems for its use and disposal on an industrial scale.

In U.S. Pat. No. 4,513,129 the use of, inter alia, n-pentane, isopentane, n-hexane is suggested for preparing ethylene/CTFE and ethylene/TFE copolymers. On the basis of the experimentation carried out by the Applicant, these products show poor efficiency as chain transfer agents at low temperatures, hence to obtain an appreciable transfer effect they must be used in large amounts with respect to the total amount of fed monomers. It results in an excessive dilution of the reaction medium and therefore a decay of kinetics. This shortcoming is particularly undesired when operating with discontinuous processes (batch or semibatch), as for instance in the case of ethylene/CTFE copolymer production. In fact, in such case the presence of great amounts of transfer agents leads, during the reaction, to a variation in the monomer composition of the reaction mixture and thus of the produced polymer. In other words, while the reaction proceeds, the organic phase becomes poorer and poorer in CTFE to such an extent that it is definitely not advisable going on with the reaction beyond a certain conversion degree. It is indeed known that, to avoid an enrichment of the ethylene monomer in the final product with subsequent decay of the polymer properties, it is necessary to keep the molar ratio between CTFE and ethylene in the reaction medium as constant as possible.

When operating in aqueous emulsion, as in the process described in the above-mentioned European patent application No. 94116994.8, the use of great amounts of chain transfer agent results quite unfeasible, since an excessive organic phase increase would cause emulsion destabilization.

The Applicant has now surprisingly found that a particular class of hydrocarbons, the alkyl-substituted cyclopentanes, are endowed with a high efficiency as chain transfer agents in (co)polymerization reactions carried out, either in suspension or in aqueous emulsion, at low temperatures, comprised between −30° and +30° C., to prepare thermoplastic hydrogen-containing fluoropolymers.

Therefore, object of the present invention is a process for preparing thermoplastic hydrogen-containing fluoropolymers, wherein the corresponding monomers are (co)polymerized at a temperature of from −30° to +30° C. in the presence, as a chain transfer agent, of a cyclopentane alkyl-substituted with one or more $C_1$–$C_6$ alkyls. Preferably, the cyclopentane is substituted with 1, 2 or 3 $C_1$–$C_4$ alkyls and can be selected, for instance, from: methylcyclopentane, n-propylcyclopentane, isobutylcyclopentane, 2-methyl-1-ethylcyclopentane, cis,cis,trans-1,2,3-trimethyl-cyclopentane, cis-1,2-dimethylcyclopentane, or mixtures thereof. Methylcyclopentane is particularly preferred. They are products which fully meet the characteristics set forth above for a chain transfer agent to be used on an industrial scale, being liquid products and thus easily manageable and dosable, and non-toxic, which yield alkyl end groups of high thermal stability.

The amount of alkyl-substituted cyclopentane to be added to the reaction medium can vary within rather wide limits, depending on the type of used monomers, on the reaction temperature and on the desired molecular weight. Generally, such amount ranges from 0.01 to 30% by weight, preferably from 0.05 to 10% by weight, with respect to the total amount of monomers fed into the reactor.

When operating in aqueous emulsion, the effectiveness of the alkyl-substituted cyclopentane can be further increased by adding a branched-chain aliphatic alcohol, as described in EP-617,058. The branched-chain aliphatic alcohol has from 3 to 12 carbon atoms and is characterized by a ratio between number of hydroxy groups and number of methyl groups lower than or equal to 0.5. It can be selected for instance from: isopropanol, tertbutanol, pinacol, 2,4-dimethyl-3-pentanol, 2,4,4-trimethyl-1,3-pentandiol, or mixtures thereof.

By thermoplastic hydrogen-containing fluoropolymers it is meant all of those polymers obtainable by homopolymerization of a hydrogen-containing fluoroolefin or copolymerization of the latter with a perfluorinated monomer, or copolymers between a per(halo) fluoroolefin and an olefin not containing halogen atoms. In particular, the process object of the present invention can be advantageously used for:

(1) copolymers between a per(halo) fluoroolefin $C_2$-$C_8$, for instance TFE or chlorotrifluoroethylene (CTFE), and a $C_2$-$C_8$ olefin not containing halogen atoms, such as for instance ethylene, propylene or isobutylene, with a molar ratio between olefin not containing halogen atoms and per(halo)fluoroolefin of from 40:60 and 60:40, optionally containing small amounts, generally of from 0.1 to 10% by mols, of one or more fluorinated comonomers, selected, for instance, from compounds of formula $CX_2=CFR_f$, wherein X is H or F, $R_f$ is a $C_2$-$C_{10}$ fluoroalkyl, optionally containing one or more ether groups (see for instance U.S. Pat. Nos. 4,513,129, U.S. Pat. No. 3,624,250), or from perfluorodioxols (see for instance patents U.S. Pat. No. 3,865,845, U.S. Pat. No. 3,978,030, EP 73,087, EP 76,581, EP 80,187);

(2) polyvinylidenefluoride or polyvinylidenefluoride modified with small amounts, generally from 0.1 to 10% by mols, of one or more fluorinated comonomers, such as vinylfluoride, chlorotrifluoroethylene, hexafluoropropene, tetrafluoroethylene, trifluoroethylene, etc. (see for instance patents U.S. Pat. No. 4,524,194 and U.S. Pat. No. 4,739,024).

The (co)polymerization reaction can be carried out either in suspension or in aqueous emulsion, in the presence of a suitable radical initiator.

In the case of suspension (co)polymerization, the reaction medium consists of an organic phase, to which water is usually added to favour dispersion of heat resulting from the reaction. The organic phase can be formed by the monomers themselves, without addition of solvents, or by the monomers dissolved in a suitable organic solvent. As organic solvents, chlorofluorocarbons, such as $CCl_2F_2$ (CFC-12), $CCl_3F$ (CFC-11), $CCl_2FCClF_2$ (CFC-113), $CClF_2CClF_2$ (CFC-114), etc. are usually employed. Since such products exert a destructive effect on stratospheric ozone, alternative products have been recently proposed, such as compounds containing only carbon, fluorine, hydrogen, and optionally oxygen, described in patent U.S. Pat. No. 5,182,342. A valid alternative is costituted by branched chain hydrocarbons as described in EP 612,767, having from 6 to 25 carbon atoms and a ratio between number of methyl groups and number of carbon atoms greater than 0.5, such as for instance 2,3-dimethylbutane, 2,3-dimethylpentane, 2,2,4 trimethylpentane, 2,2,4,6,6-pentamethylheptane, 2,2,4,4,6-pentamethylheptane, etc., or mixtures thereof.

In the case of aqueous emulsion (co)polymerization, the presence of a suitable surfactant is required. The most commonly used are fluorinated surfactants of formula:

$$R_f\text{—}X^-M^+$$

wherein $R_f$ is a (per) fluoroalkyl chain $C_5$-$C_{16}$ or a (per) fluoropolyoxyalkylene chain, $X^-$ is —COO⁻ or —SO$_3^-$, $M^+$ is selected from: H⁺, NH$_4^+$, alkali metal ion. Among them can be cited: ammonium perfluoro-octanoate, (per) fluoropolyoxyalkylenes terminated with one or more carboxyl groups, etc.

The reaction pressure is generally of from 5 to 100 bar, preferably from 10 to 40 bar.

The process object of the present invention can be advantageously carried out in the presence of perfluoropolyoxyalkylene emulsions or microemulsions, as described in patents U.S. Pat. Nos. 4,789,717 and 4,864,006, or also of fluoropolyoxyalkylenes microemulsions having hydrogen-containing containing end groups and/or hydrogen-containing repetitive units, as described in EP-625,526.

Because of the low reaction temperature, the radical initiators which decompose thermally can be selected within a rather restricted class. Generally, they must have a half-life lower than 10 hours at 30° C., and can be selected for instance from bis-acylperoxides of formula $(R_f\text{—CO—O})_2$, wherein $R_f$ is a (per)haloalkyl $C_1$-$C_{10}$ (see for instance patents EP-185,242 and U.S. Pat. No. 4,513,129), or a perfluoropolyoxyalkylene group (see for instance patents EP 186,215 and U.S. Pat. No. 5,021,516). Among them, bis-trichloroacetylperoxide is particularly preferred. Another class of initiators consists of dialkylperoxydicarbonates, wherein the alkyl has from 1 to 8 carbon atoms, such as for instance di-n-propyl-peroxydicarbonate and di-isopropylperoxydicarbonate (see patent EP 526,216).

The emulsion technique can be advantageously carried out using a radical photoinitiator in the presence of ultraviolet-visible radiation, as described in the above-mentioned European patent application No. 94116994.8 In such case, all of those chemical species, either soluble or insoluble in water, which submitted to UV-visible radiation generate radicals capable of promoting (co)polymerization of fluorinated olefinic monomers, can be used as initiators. Such products can be selected from: organic and inorganic peroxides; ketones; acylperoxides; di- or poly-ketones; peroxycarbonates; dialkylsulphides; peroxyesters; metal transition complexes; halogenated or polyhalogenated organic compounds. Therefore, it is possible to choose within a very wide class of products so as to use initiators, generally not employable with conventional methods, which give particularly stable end groups. That is the case, for instance, of diterbutylperoxide and acetone, which yield methyl end groups, particularly stable in the case of hydrogen-containing fluoropolymers.

Some working examples of the present invention are reported hereinunder, whose purpose is merely illustrative but not limitative of the scope of the invention itself.

EXAMPLE 1

In a 3 gallon glazed Pfaudler autoclave, equipped with a stirrer working at 350 rpm, 5.3 l of demineralized water, chlorotrifluoroethylene (CTFE) and methylcyclopentane were introduced in the amounts reported in Table 1. The reactor was brought to 15° C. and pressurized with ethylene up to a pressure of 193 psig. A radical initiator was then gradually introduced into the autoclave, consisting of a solution of trichloro-acetylperoxide (TCAP) in CFC-113, kept at −17° C. The pressure was kept constant for the overall duration of the polymerization by continuously feeding ethylene into the reactor. The other reaction parameters and Melt Flow Index of the produced polymer are reported in Table 1. The obtained polymer (as also those obtained in Examples 2–10) has a molar ratio CTFE/ethylene equal to about 50/50 and a second melting temperature (determined by Differential Scanning Calorimetry, DSC) of 240° C.

EXAMPLE 2

Example 1 was repeated in the same conditions, except that a greater amount of methylcyclopentane was used as chain transfer agent. The data are reported in Table 1.

EXAMPLES 3–10 (comparative)

Example 1 was repeated in the same conditions, using methylcyclohexane (Ex. 3–4), isobutane (Ex. 5–6), chloroform (Ex. 7–8), cyclopentane (Ex. 9), and n-pentane (Ex. 10) as chain transfer agents. Upon comparison with Examples 1–2, it can be noticed that methylcyclopentane is remarkably more efficient than the other hydrocarbons having a very similar structure, thus, the desired MFI of the final product being the same, it can be used in considerably lower amounts, comparable to those of chloroform.

EXAMPLE 11

In a 500 ml autoclave, equipped with a stirrer working at 900 rpm, 110 ml of isooctane and 3.0 ml of methylcyclopentane were introduced after evacuation. The reactor was brought to 10° C. and then pressurized initially with tetrafluoroethylene (TFE) up to a pressure of 15.5 bar and then with ethylene up to a working pressure of 23.1 bar. A solution of trichloroacetylperoxide (TCAP) in isooctane, kept at −15° C., having a concentration of 0.03 g/ml, was then discontinuously fed into the autoclave. About 0.015 g of TCAP were charged at the beginning, then each hour for three times during the polymerization. The pressure was kept constant for the overall duration of the reaction by continuously feeding an ethylene/TFE mixture with a molar ratio of 49/51. After 330 minutes, 38.7 g of dry polymer were obtained. A second melting temperature of 294.5° C. (by DSC) and a MFI (ASTM D3159-83) of 0.3 g/10' were measured on the product.

EXAMPLE 12

On a side wall of a 0.6 l inox steel AISI 316 autoclave equipped with a stirrer working at 600 rpm, a quartz window was inserted, in correspondence of which a Hanau® TQ-150 UV lamp was placed. It is a high pressure mercury lamp emitting radiation from 240 to 600 nm, with a power of 13.2 W for the radiation ranging from 240 to 330 nm.

The autoclave was evacuated and there were introduced successively:

325 ml of demineralized water;

2.0 g of a surfactant of formula: $CF_3O-(CF_2-CF(CF_3)O)_m-(CF_2O)_n-CF_2COO^-K^+$ having m/n= 26.2 and an average molecular weight of 595, dissolved in 50 ml of water;

1.0 ml of methylcyclopentane.

The autoclave was then brought to 10° C. and to a pressure of 11.3 absolute bar with TFE and then to 15 absolute bar with ethylene. The UV lamp was then switched on, and the addition of a solution consisting of 0.2 g of potassium persulphate (KPS) dissolved in 200 ml of water was commenced. The initiator feeding was carried out continuously, with a flow rate of 25 ml/hr for a total amount of 40 ml. The working pressure of 15 absolute bar was kept constant for the overall duration of the reaction by continuously feeding an ethylene/TFE mixture with a molar ratio 49/51. After 450 minutes, the lamp was switched off and the autoclave vented and discharged at room temperature. A latex was so obtained, which was coagulated and dried in an oven at 150° C. The obtained polymer (6.0 g) was submitted to Melt Flow Index (MFI) measurement (ASTM D3159-83) and resulted to have an excessive fluidity (MFI>300 g/10').

TABLE 1

| EX. | CTA | CTFE (Kg) | CTA/CTFE (g/Kg) | TCAP SOLUTION CONCENTRATION (g/ml) | TOTAL TCAP (g) | REACTION TIME (hrs) | PRODUCED POLYMER (g) | MFI (ASTM 3275-89) (g/10') |
|---|---|---|---|---|---|---|---|---|
| 1 | methylcyclopentane | 1.37 | 11.6 | 0.07 | 18.2 | 5 | 350 | 2.6 |
| 2 | methylcyclopentane | 1.34 | 18.9 | 0.07 | 18.5 | 3.25 | 870 | 20.7 |
| 3* | methylcyclohexane | 1.71 | 25.0 | 0.081 | 8.0 | 5 | 914 | 1.8 |
| 4* | methylcyclohexane | 1.36 | 48.7 | 0.07 | 11.6 | 8 | 628 | 9.3 |
| 5* | isobutane | 1.41 | 30.6 | 0.07 | 10.43 | 2.25 | 930 | 3.7 |
| 6* | isobutane | 1.38 | 39.9 | 0.07 | 10.88 | 3.75 | 622 | 13.2 |
| 7* | chloroform | 1.38 | 9.1 | 0.07 | 14.0 | 3.25 | 874 | 4.4 |
| 8* | chloroform | 1.31 | 12.8 | 0.055 | 6.9 | 15.5 | 805 | 27.7 |
| 9* | cyclopentane | 1.39 | 21.6 | 0.07 | 8.82 | 2.5 | 1222 | 2.9 |
| 10* | n-pentane | 2.35 | 33.8 | 0.094 | 11.0 | 5.5 | 1365 | s.f. |

*comparative
CTA: chain transfer agent
CTFE: chlorotrifluoroethylene
TCAP: trichloroacetylperoxide
s.f.: scarce fluidity

We claim:

1. Process for preparing thermoplastic hydrogen-containing fluoropolymers, wherein the corresponding monomers are (co)polymerized at a temperature of from −30° to +30° C. in the presence, as chain transfer agent, of a cyclopentane alkyl-substituted with one or more alkyls $C_1$–$C_6$.

2. Process according to claim 1, wherein cyclopentane is substituted with 1, 2 or 3 alkyls $C_1$–$C_4$.

3. Process according to claim 2, wherein the alkyl-substituted cyclopentane is methylcyclopentane.

4. Process according to claim 1, wherein the added amount of alkyl-substituted cyclopentane varies from 0.01 to 30% by weight with respect to the total amount of fed monomers.

5. Process according to claim 1, wherein it is operated in aqueous emulsion in the presence of a branched chain aliphatic alcohol having from 3 to 12 carbon atoms and characterized by a ratio between number of hydroxy groups and number of methyl groups lower than or equal to 0.5.

6. Process according to claim 1, wherein it is operated in aqueous emulsion using a radical photoinitiator in the presence of ultraviolet-visible radiation.

7. Process according to claim 1, wherein it is operated in suspension in an organic solvent.

8. Process according to claim 1, wherein a copolymer is prepared between a per (halo) fluoroolefin $C_2$–$C_8$ and a $C_2$–$C_8$ olefin not containing halogen atoms, with a molar ratio between olefin not containing halogen atoms and per(halo)-fluoroolefin comprised between 40:60 and 60:40.

9. Process according to claim 8, wherein the per(halo) fluoroolefin is selected from tetrafluoroethylene and chlorotrifluoroethylene, while the olefin not containing halogen atoms is ethylene.

10. Process according to claim 8, wherein the copolymer contains from 0.1 to 10% by mols of one or more fluorinated comonomers.

11. Process according to claim 1, wherein polyvinylidenefluoride or polyvinylidenefluoride modified with one or more fluorinated comonomers in an amount of from 0.1 to 10% by mols, is prepared.

* * * * *